A. F. STAPLES & C. W. POTTER

ACCOUNT REGISTER.

APPLICATION FILED FEB. 10, 1909.

Reissued Mar. 8, 1910.

13,091.

2 SHEETS—SHEET 1.

Inventors

Albert F. Staples

Charles W. Potter

Witnesses

Edwin L. Bradford

C. C. Wright

By

Edward R. Alexander

Attorney

A. F. STAPLES & C. W. POTTER

ACCOUNT REGISTER.

APPLICATION FILED FEB. 10, 1909.

Reissued Mar. 8, 1910.

13,091.

2 SHEETS—SHEET 2.

Witnesses

Edwin L. Bradford

C. C. Wright

Inventors

Albert F. Staples

Charles W. Potter

By

Edward T. Alexander

Attorney

UNITED STATES PATENT OFFICE.

ALBERT F. STAPLES, OF ALLIANCE, OHIO, AND CHARLES W. POTTER, OF BOSTON, MASSACHUSETTS, ASSIGNORS TO THE McCASKEY REGISTER CO., A CORPORATION OF OHIO.

ACCOUNT-REGISTER.

13,091. Specification of Reissued Letters Patent. Reissued Mar. 8, 1910.

Original No. 870,594, dated November 12, 1907, Serial No. 360,106. Application for reissue filed February 10, 1909. Serial No. 477,254.

*To all whom it may concern:*

Be it known that we, ALBERT F. STAPLES and CHARLES W. POTTER, citizens of the United States, and now residing, respectively, at Alliance, in the county of Stark and State of Ohio, and at Boston, in the county of Suffolk and State of Massachusetts, have invented certain new and useful Improvements in Account-Registers; and we do hereby declare the following to be a full, clear, and exact description of the invention.

The present invention relates to account registers of the type in which a number of frames carrying bill holders are pivotally arranged on a base so as to be turned like the leaves of a book, and one object of the invention is to so construct the base that the bottoms of the frames, which are more or less separated when the device is in use, may be brought close together when the device is not in use, so that the frames may then form a compact group which may be more conveniently stored in a safe or vault than with the ordinary construction.

Another object is to provide the device with improved bill holders adapted to permit the easy examination of the bills without their removal from the holders, and to separate a portion of the bills in each holder from the remainder.

A third object is to provide an improved construction of the pivots and the pintles of the springs by which the movements of the frames are controlled in order to secure greater rigidity in these parts and to permit the use of an improved form of spring.

A fourth object of the invention is to provide an improved form of index, and a fifth object is to reduce the friction resulting from the relative movements of the leaves as they are swung from one position to another.

Other objects of the invention will be noted in connection with the description of the illustrated embodiment thereof.

Figure 1:
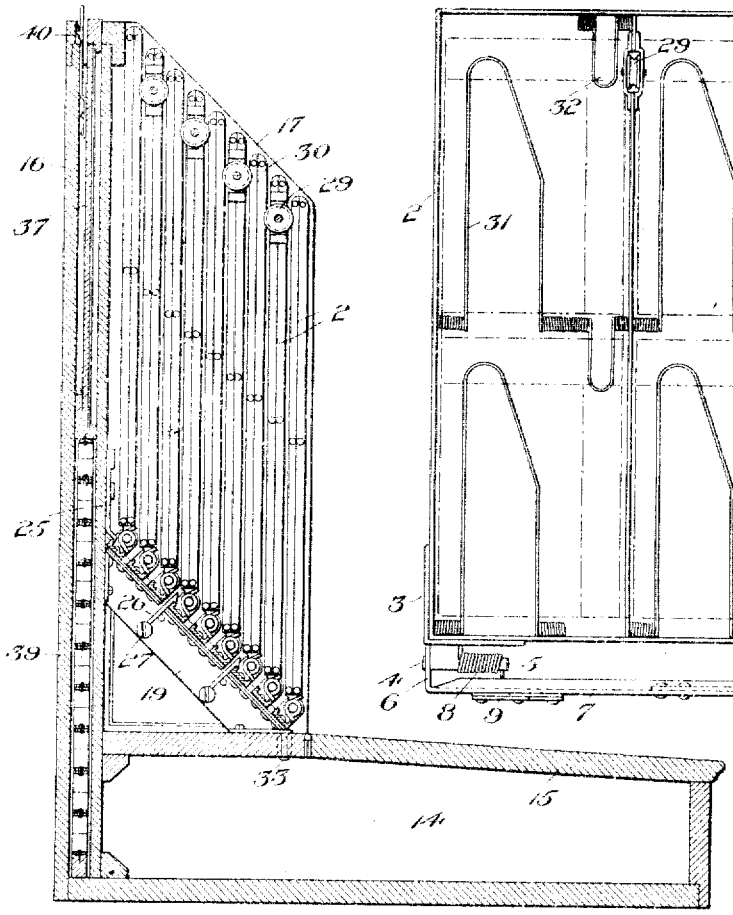
Figure 2:
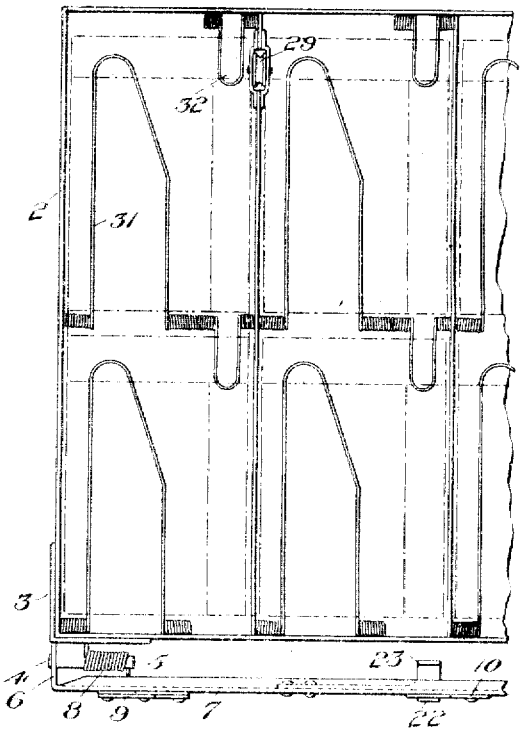
Figure 3:
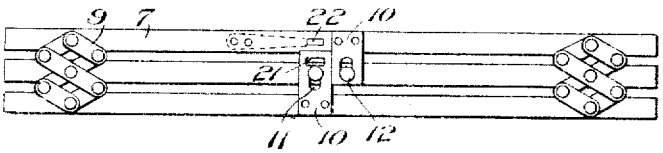
Figure 4:
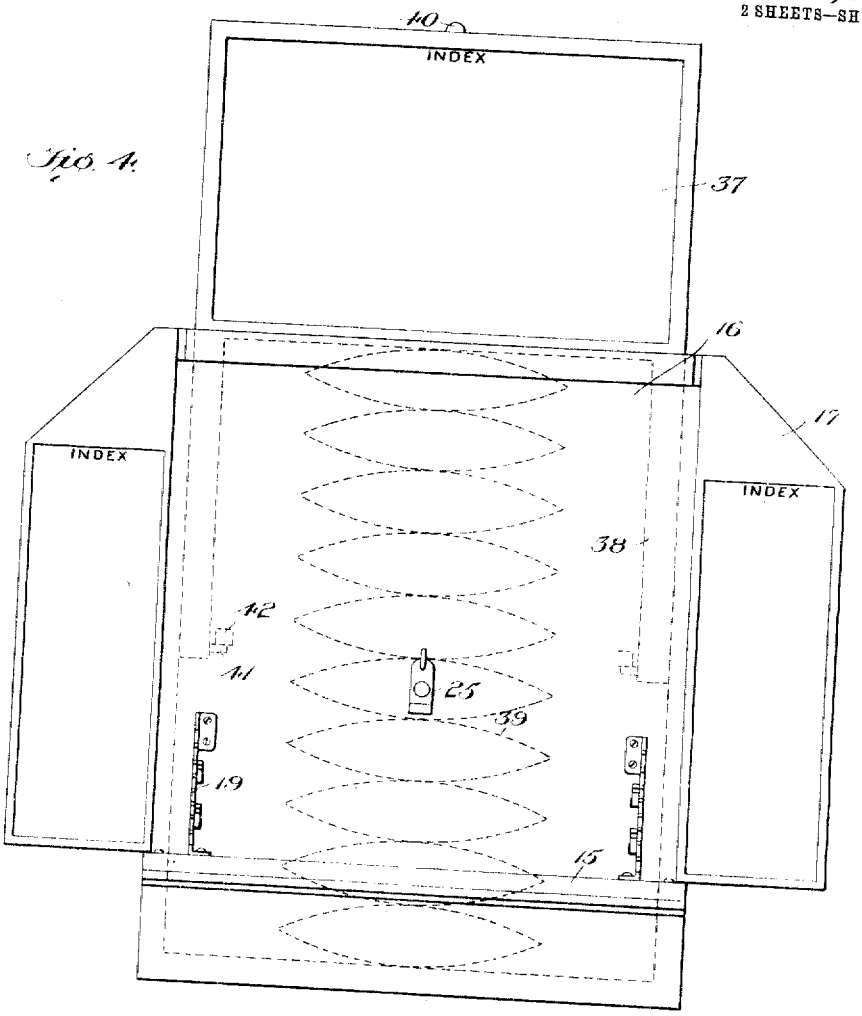
Figure 5:
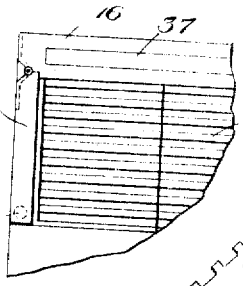
Figure 6:
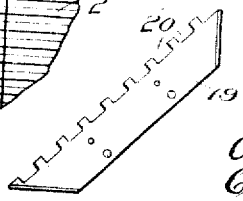
Figure 7:
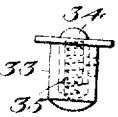

In the drawings—Figure 1 is a sectional elevation of a complete account register embodying the present invention. Fig. 2 is a front elevation of a group of frames removed from the cabinet. Fig. 3 is a bottom view of the group of frames. Fig. 4 is a front elevation of the cabinet, with the frames removed and the index in position for use. Fig. 5 is a detail plan view of a portion of the register showing the manner in which the sides of the cabinet are hinged to the back. Fig. 6 is a detail side elevation of one of the frame-base supports. Fig. 7 is a detail side elevation of one of the side catches.

The illustrated embodiment of the invention comprises a cabinet 1 in which the frames are mounted when the device is in use, and a number of frames 2 upon which the bill holders are mounted. Each frame 2 is provided at its lower corners with a corner piece 3 comprising integrally a pivot 4 and a spring pintle 5 extending co-axially in opposite directions. The pivots are received in upturned ears 6 on independent base bars 7, and coil springs 8 surround the spring pintles and engage the frames and the base bars, so as to counterbalance the frame in the usual manner. The base bars are connected by lazy-tongs 9 pivoted to them, and this construction permits the base bars to have free relative lateral movement, while it prevents the bars from being rotated by the springs and holds them in alinement.

As shown in Fig. 3, the frames are divided into three groups of three frames each, which may be handled separately so that the handling of a large and heavy body of frames is avoided. To prevent relative longitudinal movement of the base bars, and to limit their lateral movement, slides 10 are riveted to the outside base bars of each group and are slotted at 11 to receive studs 12 fixed on the middle base bar. The studs slide freely in the slots, but prevent longitudinal movements of the frames. They also assist the lazy-tongs in holding the bars in alinement.

The cabinet 1 comprises a base portion 14 provided with a hinged cover 15 and affording space for the reception of charge-slip blocks, etc., a back 16 against which the upright frames rest when the device is in use, and two side pieces 17 which are hinged to the back at their rear edges. The cabinet is provided with two inclined supports 19 provided with suitably-spaced notches 20. When the frames are inserted in the cabinet the bas bars are separated and are inserted in the notches, so that the supports 19 serve not only to support the base bars and the frames, but also to space the base bars properly, to permit the frames to be swung on their pivots.

When the frames are removed from the cabinet for the purpose of storing them in a safe or vault the base bars are pressed together, and the frames are thus brought to a position in which they are all parallel and exactly superposed, so that they form a body of minimum bulk which can be stored in a small space. To secure the base bars in this position one of the slides 10 is provided with a slot 21 which is engaged, when the frames are in closed position, by a spring catch 22 mounted on one of the base bars. The catch is provided with a finger piece 23 by which it may be released when the frames are to be inserted in the cabinet.

The base of the rearmost group of frames is secured in the cabinet by a swinging latch 25 pivoted to the back of the cabinet and engaging the rearmost base bar. The other groups of frames are secured in place by latches 26 pivoted at 27 to the supports 19 and engaging the rearmost base bars of their respective bases. These latches may be swung back to release the bases by pressing against their upper ends, and they are returned to operative position by gravity.

To reduce the friction between adjacent frames due to their relative movement when two or more frames are swung down at once, rollers 29 are journaled in the upper portion of each alternate leaf, and these rollers engage the ribs 30 on the adjacent frames and separate the frames sufficiently to prevent rubbing between them. The rollers are grooved, so also to operate to resist relative lateral movements of the frames and thus to stiffen the groups of frames, especially when removed from the cabinet.

The bill holders, as shown in Fig. 2, comprise each two spring wire clips, of which one, 31, is arranged to hold the bills in place against the frame, with the exception of the right hand margin, while an auxiliary clip 32 engages the part of the bill left free by the other clip. This arrangement affords convenient means for keeping track of the daily business. The bills of the current day are inserted under the clip 31 only, so that they are thus distinguished from the bills of previous days, which are inserted under the auxiliary clip also. As the margins of the bills containing the columns of figures are left free by the clip 31, the bills for the day may be examined without removing them from the clip, by turning up these margins.

The inner surfaces of the sides 17 of the cabinet are utilized to support the index, and when the index is in use the sides are swung back on their hinges, as shown in Fig. 4. When the sides are in closed position, as in Fig. 5, they are retained by spring-pressed catches 33 provided with rounded extremities 34 which are pressed upward, by springs 35, into corresponding recesses in the bottoms of the sides.

An important advantage of the hinged construction of the sides of the cabinet, apart from the use of the sides to support the index, resides in the fact that when the sides are swung back access to the rearmost bill holders is facilitated, and the necessity of reaching into a corner to gain access to the bills at the sides of the frames, which arises in account registers of this type as usually constructed is avoided.

Further provision for the index is made by an index frame 37 mounted to slide vertically in a recess in the back of the cabinet. Downward extensions 38 guide this frame and a spring 39 tends constantly to raise it into operative position, as shown in Fig. 4. When the index is not in use it is pressed down into the recess and retained there by a spring catch 40. Pins 41 on the guides 38 limit the upward movement of the index frame by engagement with stops 42 on the cabinet.

The lazy-tongs connecting the base bars, in addition to their functions noted above, operate also to automatically equalize the spaces between the bars when they are moved apart, and thus facilitate the insertion of the bars in the cabinet.

Owing to the rigid construction of the hinge-pivot and spring-pintle construction, it is not necessary to extend the springs upward and attach them to the frames at a considerable distance above the bottoms of the leaves, as has been necessary in previous account registers of this type, and a sharp bend in the springs at the bottom of the frame is thereby avoided, rendering the springs less liable to break and reducing the cost of their manufacture.

The several features of the invention may be used separately or in conjunction, and the invention is not limited to the details of construction and operation of the illustrated embodiment, but may be embodied in other forms broadly defined in the claims.

Having now described the invention, what is claimed is:

1. An account register having, in combination, a plurality of bill-holder frames, a base for the frames comprising a plurality of relatively movable base bars connected together, and pivotal connections between each bill-holder frame and one of the base bars.

2. An account register having, in combination, a plurality of bill-holder frames, a base bar pivotally connected with each frame, and connections between the base bars permitting relative lateral movements but preventing rotation of the bars.

3. An account register having, in combination, a plurality of bill-holder frames, a base bar pivotally connected with each frame, a spring interposed between each frame and its base bar and tending to cause relative movement of these parts, and connections between the base bars permitting relative lateral movements but preventing rotation thereof.

4. An account register having, in combination, a plurality of bill-holder frames, a base bar pivotally connected with each frame, and connections between the base bars constructed and operating to permit relative lateral movements thereof and to equalize the distances between the bars.

5. An account register having, in combination, a plurality of bill-holder frames, a base bar pivotally connected with each frame, and a lazy-tongs connection between the base bars acting to equalize the spaces between the bars.

6. An account register having, in combination, a plurality of bill-holder frames, a base bar pivotally connected with each frame, and means for holding the base bars together when the device is not in use.

7. An account register having, in combination, a plurality of bill-holder frames, a base bar pivotally connected with each frame, connections between the bars constructed and operating to keep them in alinement but to permit relative lateral movement of the bars, and means for holding the bars together when the device is not in use.

8. An account register having, in combination, a plurality of bill-holder frames, a base bar pivotally connected with each frame, a spring interposed between each frame and its base bar, a cabinet, and means in the cabinet for receiving and uniformly spacing the bars when the device is in use.

9. An account register having, in combination, a plurality of bill holder frames, a base bar pivotally connected with each frame, and connections between the base bars constructed and operating to permit relative lateral movements of the base bars and to limit such movements.

10. An account register having, in combination, a plurality of bill-holder frames, a base bar pivotally connected with each frame, connections between the base bars constructed and operating to equalize the spaces between the bars when the bars are moved with relation to each other, and a cabinet provided with means for receiving and spacing the bars.

11. An account register having, in combination, a plurality of bill-holder frames, a base bar pivotally connected with each frame, connections between the base bars constructed to equalize the spaces between the bars when they are moved with relation to each other, and a cabinet provided with means for rotating the bars.

12. An account register having, in combination, a bill-holder frame, a base member therefor, a pivot fixed to and outwardly projecting from each lower corner of the frame and engaging the base member, spring pintles fixed to and inwardly projecting from said corners, and springs interposed between the base member and the frame, the springs being mounted on said spring pintles and removable from the inner ends thereof.

13. An account register having, in combination, a plurality of pivotally mounted bill-holder frames, and an anti-friction roller journaled on one of the frames and engaging the adjacent frames to separate the frames and reduce the friction between them.

14. In an account register, the combination of a plurality of bill-holder frames, means for pivotally supporting the bill-holder frames in operative position, and connections between the pivotal supporting means permitting relative lateral movement of the said supporting means.

15. In an account register, the combination of a plurality of bill-holder frames, means for pivotally supporting the bill-holder frames in operative position, connections between the pivotal supporting means permitting relative lateral movement of the said supporting means, and means for preventing longitudinal movement of the frames relative to each other.

16. In an account register, the combination of a plurality of independent groups of pivotally mounted bill-holder frames, and means for independently supporting each group of frames to permit the simultaneous swinging about their respective pivots of any number of said frames.

17. In an account register, the combination of a plurality of groups of pivotally mounted bill-holder frames, means connecting the frames of each group and permitting their lateral movement relatively to each other, and means for independently supporting each group of frames with the frames in each group equally spaced from each other.

18. In an account register, the combination of a plurality of base bars arranged in groups, a bill-holder frame pivoted to each base bar, means for supporting the groups of frames in operative position, means permitting relative lateral movement between the base bars of each group, and means for locking them against lateral movement when the frames are not in use.

19. In an account register, the combination of a plurality of bill-holder frames, means for pivotally supporting each of the frames, and means connecting said pivotal supporting means for the frames, operating when said pivotal supporting means are moved toward or from each other to uniformly space them relatively to each other.

20. In an account register, the combination of a plurality of independent groups of pivotally mounted bill-holder frames, an inclined support for the said groups, and means carried by the support engaging each group of frames for supporting it independently of the other groups and permitting the simultaneous swinging about their respective pivots of any number of said frames.

21. In an account register, the combination of a plurality of independent groups of pivotally mounted bill-holder frames, and means, comprising an inclined support and a plurality of catches, one for each group, for supporting the said groups of frames and arranged to permit the simultaneous swinging about their respective pivots of any number of said frames.

In witness whereof we affix our signatures in the presence of two witnesses.

ALBERT F. STAPLES.
CHARLES W. POTTER.

Witnesses to the signature of Albert F. Staples:

IVA MAEDER,
J. J. BROWN.

Witnesses to the signature of Charles W. Potter:

RUTH A. SIMONDS,
ANNIE G. HOLT.

Correction in Reissue Letters Patent No. 13,091.

It is hereby certified that in Reissue Letters Patent No. 13,091, granted March 8, 1910, upon the application of Albert F. Staples, of Alliance, Ohio, and Charles W. Potter, of Boston, Massachusetts, for an improvement in "Account-Registers," an error appears in the printed specification requiring correction, as follows: Page 3, line 64, the word "rotating" should read *retaining;* and that the said Letters Patent should be read with this correction therein that the same may conform to the record of the case in the Patent Office.

Signed and sealed this 5th day of April, A. D., 1910.

[SEAL.]

C. C. BILLINGS,

*Acting Commissioner of Patents.*